(12) United States Patent
Li et al.

(10) Patent No.: US 8,578,436 B2
(45) Date of Patent: Nov. 5, 2013

(54) METHOD FOR TWO TIME-SCALES VIDEO STREAM TRANSMISSION CONTROL

(75) Inventors: Bo Li, Beijing (CN); Hai-Miao Hu, Beijing (CN); Peng Wang, Beijing (CN); Shu Xian, Beijing (CN)

(73) Assignee: Beihang University, Beijing (CN)

( * ) Notice: Subject to any disclaimer, the term of this patent is extended or adjusted under 35 U.S.C. 154(b) by 0 days.

(21) Appl. No.: 13/500,069

(22) PCT Filed: Dec. 16, 2010

(86) PCT No.: PCT/CN2010/079869
§ 371 (c)(1),
(2), (4) Date: Apr. 4, 2012

(87) PCT Pub. No.: WO2012/079236
PCT Pub. Date: Jun. 21, 2012

(65) Prior Publication Data
US 2013/0263200 A1    Oct. 3, 2013

(51) Int. Cl.
H04N 7/173 (2011.01)
G01R 31/08 (2006.01)
H04B 1/66 (2006.01)

(52) U.S. Cl.
USPC ............ 725/116; 725/118; 370/235; 375/240

(58) Field of Classification Search
None
See application file for complete search history.

(56) References Cited

U.S. PATENT DOCUMENTS

| | | | | |
|---|---|---|---|---|
| 5,497,375 A | * | 3/1996 | Hluchyj et al. | 370/232 |
| 7,987,106 B1 | * | 7/2011 | Aykin | 705/7.11 |
| 2003/0026207 A1 | * | 2/2003 | Loguinov | 370/235 |
| 2004/0233844 A1 | * | 11/2004 | Yu et al. | 370/230 |
| 2006/0161335 A1 | * | 7/2006 | Beinhaker | 701/200 |
| 2007/0115814 A1 | * | 5/2007 | Gerla et al. | 370/230 |
| 2009/0198559 A1 | * | 8/2009 | Wang et al. | 705/10 |
| 2010/0257133 A1 | * | 10/2010 | Crowe et al. | 706/58 |

OTHER PUBLICATIONS

Hwangnam Kim, Jennifer C. Hou, "Enabling network calculus-based simulation for TCP congestion control", Aug. 27, 2008, Computer Networks 53 (2009) 1-24.*

* cited by examiner

Primary Examiner — Mark D Featherstone
Assistant Examiner — Michael M Nguyen
(74) Attorney, Agent, or Firm — Mark M. Friedman

(57) ABSTRACT

A method for two time-scales video stream transmission control is proposed, which mainly includes the following three steps. Firstly, a model-based long time-scale bandwidth trend extraction step is proposed to calculate a current bandwidth through a Transmission Control Protocol (TCP) throughput model, and predict a trend of network bandwidth by using an Exponential Smooth Model (ESM) according to the calculated current bandwidth. Secondly, a short time-scale bandwidth fluctuation detection step is proposed to divide a network status into three categories and according to different network statuses, additively increase or multiplicatively decrease the estimated bandwidth. Thirdly, a target bit rate adjustment step based on two asymmetrical thresholds is proposed to set an up-threshold and a down-threshold of bandwidth to avoid frequently adjusting a target bit rate of an encoder. The method can satisfy the requirements of TCP-friendliness, real-time, and smoothness for the video transmission.

6 Claims, 6 Drawing Sheets

METHOD FOR TWO TIME-SCALES VIDEO STREAM TRANSMISSION CONTROL

FIELD OF THE INVENTION

The present invention relates to a video stream transmission control method, and more particularly to a method for two time-scales video stream transmission control, which belongs to the field of the multimedia communication technology.

BACKGROUND OF THE INVENTION

The real-time video transmission usually adopts the connectionless-oriented User Datagram Protocol (UDP) due to its large data volume and real-time requirement. However, there is no congestion control mechanism in UDP. Currently, the internet is a Best-Effort network and cannot ensure the Quality of Service (QoS), which results in the problems such as the bandwidth fluctuations, the packet loss and the transmission delay. Also, the network status changes dynamically and cannot be accurately estimated through the conventional models, which is a major problem for real-time video transmission. Therefore, to ensure the QoS of the real-time video transmission, the adaptive video transmission control mechanism has to be adopted, and the video transmission control has the following three requirements:

(1) Transmission Control Protocol (TCP)-Friendliness: A flow is TCP-friendly if, and only if, in a steady state, it uses in the long term no more bandwidth than a conforming TCP flow that would be used under comparable conditions, that is, a TCP-Friendly flow and a TCP flow can evenly share the bandwidth for a long time in the same channel and there is no aggressive occupation of the bandwidth.

(2) Real-time: To reduce the influence (on the video quality) from bandwidth fluctuations, which may be caused by abrupt changes of background traffic, the real-time transmission control has to detect the network bandwidth fluctuations, and correspondingly, to adjust the sending rate to adapt to the network bandwidth fluctuations in real time, so as to reduce the packet loss ratio during the video transmission.

(3) Smoothness: The target bit rate of the encoder is determined according to the bandwidth output by the real-time video transmission control, and furthermore, the target bit rate determines the perceptual quality of a video stream. The perceptual quality of a video stream is better in the case of a slightly degradation of image fidelity but maintaining a smooth subjective quality than in the case of a high fidelity but a serious fluctuation of subjective quality. Therefore, smoothness is a special requirement of the video transmission control.

The real-time video transmission needs to meet different requirements within different time-scales, namely, a long time-scale requirement and a short time-scale requirement. The real-time video transmission has an obvious characteristic of two time-scales in terms of both the network bandwidth fluctuation and the perceptual quality of video stream.

The network bandwidth can be regarded as a time sequence and can be divided into two parts, namely, the trend item and the disturbance item, as shown in FIG. 1. The trend item is a general tendency of the network bandwidth and shows the direction in the way network bandwidth is developing, which is usually relatively smooth. Therefore, the trend of network bandwidth can be appropriately predicted through a suitable prediction model. The trend item is the long time-scale feature of the network bandwidth, and the TCP-friendly requirement of video transmission control reflects such the long time-scale requirement (according to the aforementioned definition of TCP-friendliness). Due to the changes of the network background traffic and the instability of the video traffic (caused by the fluctuations of the video quality), the actual network bandwidth fluctuates around the bandwidth trend within a short time. The variation of the network bandwidth within a short time is regarded as a disturbance item and is mainly caused by an abrupt change of the network background traffic. The disturbance item is the short time-scale feature of the network bandwidth, and the real-time requirement of the video transmission control reflects such the short time-scale requirement.

The real-time video transmission requires that the network bandwidth can be friendly shared in a long time-scale and the fluctuations of the network bandwidth can be quickly responded in a short time-scale. Therefore, to ensure the quality of the real-time video transmission, a multiple-scales video stream transmission control mechanism is required. In the long time-scale, the trend of the network bandwidth should be accurately extracted, and meanwhile, the TCP-friendliness of the transmission should be ensured. On the other hand, in the short time-scale, the fluctuations of the network bandwidth should be responded in time, and meanwhile, the smoothness of video quality should be ensured. According to the above analysis, the real-time video transmission control has an obvious multiple time-scales requirement. Therefore, in order to meet the requirements of TCP-friendliness, real-time and smoothness, the video transmission control scheme should be designed aiming at different time-scales.

The conventional transmission control methods can be divided into two categories, namely, the model-based method and the additive increase/multiplicative decrease (AIMD) method. In the model-based method, the TCP throughput model is employed to calculate the network bandwidth according to network feedback information, such as the packet loss ratio, transmission delay. This method can achieve a smooth bandwidth estimation and can efficiently extract the trend of network bandwidth. However, the TCP throughput model highly relates to the network feedback information, which may result in some delay, such as, the statistics and the transmission of feedback information at the decoder (video receiver), and the processing of the feedback information at the encoder (video sender). So there will be a mismatch between the estimated bandwidth and the current actual bandwidth. Therefore, the model-based method cannot adapt to the bandwidth fluctuation in time. In the AIMD method, according to different network statuses, the previous estimated bandwidth is additively increased or multiplicatively decreased to achieve the estimation of current actual bandwidth. So the AIMD method can quickly adapt to the network bandwidth fluctuations. But because the output bandwidth of AIMD method will result in a sawtooth shape similar to that of TCP within a short time, the AIMD method cannot achieve the smooth estimation of bandwidth. Moreover, both the above two methods are single time-scale control method, which cannot meet the multiple time-scales requirement of video transmission control.

SUMMARY OF THE INVENTION

The present invention provides a method for two time-scales video stream transmission control. The method includes long time-scale control and short time-scale control, so as to implement video stream transmission control of multiple time-scales and provide a stable and high quality video stream to users.

To achieve the above objective, the present invention adopts the following technical solution.

A method for two time-scales video stream transmission control, which includes the following steps:

(A) dividing transmission control into two different time-scales, namely, a long time-scale and a short time-scale, and one long time-scale includes a plurality of short time-scales;

(B) for the long time-scale transmission control, calculating the current bandwidth through the TCP throughput model, predicting the trend of network bandwidth by using an Exponential Smooth Model (ESM) according to the calculated current bandwidth, and using the predicted trend of network bandwidth as an initial value for the subsequent short time-scale transmission control;

(C) for the short time-scale transmission control, according to different network transmission packet loss ratio, dividing the network status into three categories, namely the light load, the full load, and the congestion load; when the network status is the light load, increasing the estimated bandwidth through an additive factor; when the network status is the congestion load, decreasing the estimated bandwidth through a multiplicative factor; and when the network status is full load, keeping the estimated bandwidth unchanged;

(D) during the adjustment of the encoder target bit rate, setting an up-threshold and a down-threshold for the estimated bandwidth; in which if the difference between the estimated bandwidth and the current target bit rate of the encoder is between the up-threshold and the down-threshold, the encoder maintain the current target bit rate; and otherwise, the encoder adjusts the target bit rate according to the estimated bandwidth.

For the method for two time-scales video stream transmission control as discussed above, the feature is that in Step (B), the ESM in following Equation (1) is adopted to predict the trend of network bandwidth:

$$T_t = \alpha \times x_t + (1-\alpha) \times T_{t-1} \qquad (1)$$

where $T_t$ is the predicted trend of bandwidth at time t, $x_t$ is the calculated bandwidth at time t through the TCP throughput model, α is the smoothness factor and its range is (0,1).

In the above method for two time-scales video stream transmission control, the feature lies in that the smoothness factor α is dynamically adjusted according to the current bandwidth statues. When the network bandwidth increases, α equals to a relatively small value within the range of (0,1). When the network bandwidth decreases, α equals to a relatively big value within the range of (0,1).

In the above method for two time-scales video stream transmission control, the feature lies in that in Step (C) the following Equation (2) is adopted to decide the multiplicative factor which is used to decrease the estimated bandwidth:

$$\omega = 1 - \beta \cdot \sqrt{P_{loss}(n)} \qquad (2)$$

where ω is the multiplicative factor, $P_{loss}(n)$ is the packet loss ratio at time n, β is a coefficient, and $\beta \in [0,1]$.

In the above method for two time-scales video stream transmission control, the feature lies in that in Step (C) the decision of the additive factor specifically includes:

if no congestion has occurred within a long time-scale, setting the additive factor as a constant;

if congestion has occurred within a long time-scale, the following Equation (3) is adopted to decide the additive factor:

$$\theta = (1 - e^{-0.5(1-f(n)/T_t)})(F - f(n)) \qquad (3)$$

where θ is the additive factor, F is the estimated bandwidth when the last congestion occurs, $T_t$ is the predicted trend of network bandwidth output by the long time-scale transmission control, and f(n) is the estimated bandwidth at time n.

In the above method for two time-scales video stream transmission control, the feature lies in that in Step (D), the values of the up-threshold and the down-threshold change according to different network bandwidth ranges, their values are asymmetrical, and the up-threshold is greater than the down-threshold.

In the present invention, a two time-scales video transmission control method is proposed to include the long time-scale transmission control and the short time-scale transmission control. By combining the transmission control with the encoding control, the proposed method can ensure the requirements of TCP-Friendliness, real-time and smoothness. The present invention can desirably meet the multiple time-scales requirement of real-time video transmission, and meanwhile, can effectively utilize the network bandwidth resources to provide a stable and high quality video stream.

BRIEF DESCRIPTION OF THE DRAWINGS

The present disclosure will become more fully understood from the detailed description given herein below for illustration only, and thus are not limitative of the present disclosure, and wherein.

DETAILED DESCRIPTION OF THE PREFERRED EMBODIMENTS

Figure 1:
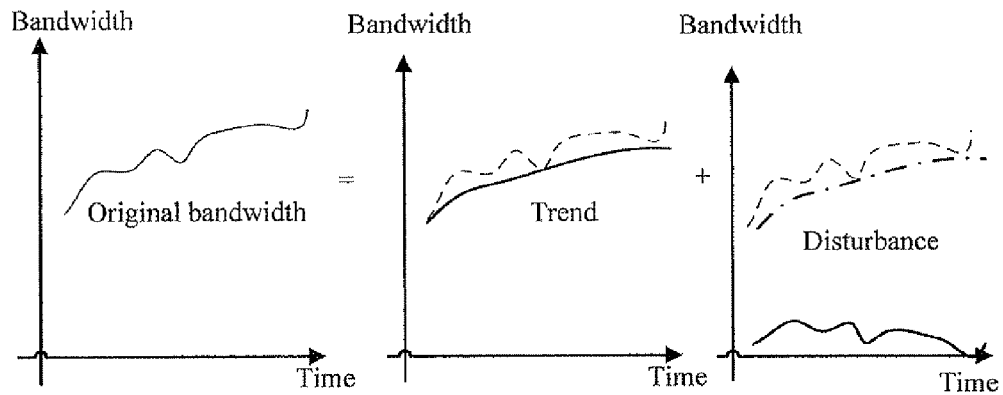
FIG. 1 is a schematic exploded diagram of a bandwidth.
Figure 2:
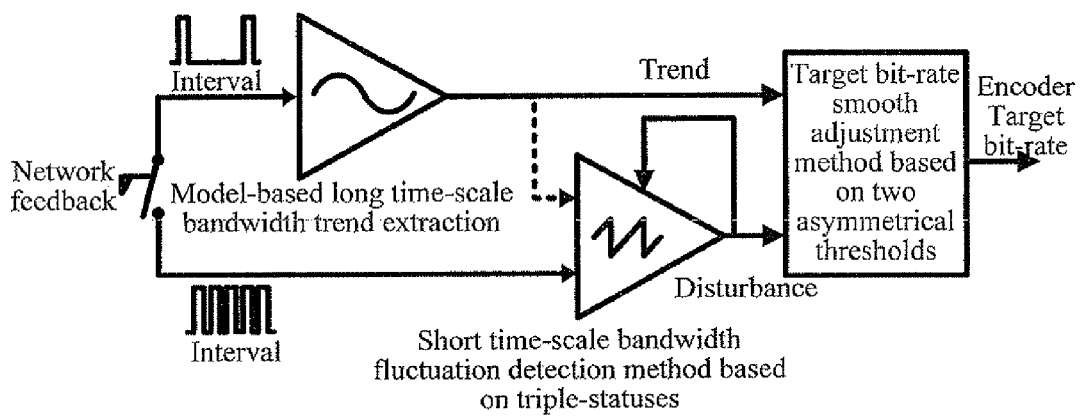
FIG. 2 is a schematic block diagram of a method for two time-scales video stream transmission control.

The present invention provides a method for two time-scales video stream transmission control and the specific implementation steps are as shown in FIG. 2, which mainly include the following three parts. Firstly, a model-based long time-scale bandwidth trend extraction method is proposed to calculate the current bandwidth through the Transmission Control Protocol (TCP) throughput model, and predict the trend of network bandwidth by using an Exponential Smooth Model (ESM) according to the calculated current bandwidth. Secondly, a short time-scale bandwidth fluctuation detection method is proposed to divide the network status into three categories, namely, the light load, the full load and the congestion load, and according to different network statuses, additively increase or multiplicatively decrease the estimated bandwidth through the proposed additive factor or multiplicative factor. Thirdly, a target bit rate adjustment method based on two asymmetrical thresholds is proposed to set an up-threshold and a down-threshold of bandwidth to avoid frequently adjusting the target bit rate of the encoder and to ensure the smooth perceptual quality. The present invention has a distinct characteristic of two time-scales and can ensure the requirements of TCP-friendliness, real-time, and smoothness for the video transmission. The division of the long time-scale and the short time-scale may be decided according to different application requirements, for example, the long time-scale can be set to 2 minutes and the short time-scale can be set to 2 seconds. The specific illustration is provided below.

1 The Model-Based Long Time-Scale Bandwidth Trend Extraction Method

In order to efficiently extract the trend of network bandwidth, a relatively long measurement interval is required. The AIMD method is suitable for responding to the fluctuation of network bandwidth within a short time-scale but not suitable for the measurement within a long time-scale. In the aforementioned model-based transmission control method, the trend of network bandwidth can be extracted by extending the measurement interval. In addition, the negative impact of background traffic changes within a short time can be reduced and the feedback information, such as the packet loss ratio and round-trip delay, can be accurately measured by extending the measurement intervals. Therefore, the model-based transmission control method is more suitable for the extraction of the network bandwidth trend.

However, the extension of measurement interval will incur the lag between the current actual bandwidth and the trend of the bandwidth. Therefore, it is necessary to employ a appropriate prediction method and utilize the historical feedback information together with the calculated bandwidth (through the TCP throughput model) to predict the trend of the bandwidth. In the implementation, a common ESM may be adopted for the bandwidth trend prediction. It can be understood that other prediction methods (for example, the moving average and the weighted moving average) can also be adopted.

The ESM is a weighted prediction model, which requires the current measurement value, the previous prediction value and the smoothness factor for prediction, and has very low data storage and computational complexity. Moreover, the data output through the ESM can maintain a desirable smoothness. The equation of the ESM is shown as follows:

$$T_t = \alpha \times x_t + (1-\alpha) \times T_{t-1} \quad (1)$$

where $T_t$ is the bandwidth trend prediction at time t, $T_{t-1}$ is the bandwidth trend prediction at time t−1, $\alpha$ is the smoothness factor, and its range is (0,1), and $x_t$ is the bandwidth value calculated through the TCP throughput model, and the TCP throughput model is as shown in Equation (2):

$$x_t = \min\left\{\frac{W_m s}{t_{RTT}}, \frac{s}{t_{RTT}\sqrt{\frac{2bp}{3}} + t_{RTO}\min\left(1, \sqrt{\frac{3bp}{8}}\right)p(1+32p^2)}\right\} \quad (2)$$

where $t_{RTT}$ is the network transmission round-trip delay, $t_{RTO}$ is the retransmission time-out, s is the size of a data packet, p is the packet loss ratio, $W_m$ is the largest congestion window, b is the number of data packets that are successfully received as can be confirmed by a ACK (Acknowledge) feedback packet, usually, b is equal to 1.

Generally, the ESM model adopts a constant smoothness factor $\alpha$ to implement the smooth prediction. Another optimal method is to dynamically determine the smoothness factor according to different network statuses, namely increase or decrease, so as to make the adjustment possess the basic characteristic of "additive increase/multiplicative decrease", and so as to further ensure the TCP-friendliness.

In this embodiment, the transmission control is divided into two different time-scales, namely a long time-scale and a short time-scale. One long time-scale includes a plurality of short time-scales. The processing flow of the optimal model-based long time-scale bandwidth trend extraction method in this embodiment is as follows.

S1: An encoder (video sender) receives feedback information such as a network packet loss ratio p and a round-trip delay $t_{RTT}$ and calculates the bandwidth through the TCP throughput model (Equation (2)).

S2: According to the calculated bandwidth in S1 and a group of previous calculated bandwidth, the network status is determined. If the network status is determined only according to a single previous calculated bandwidth, the adjustment will become too frequent. Therefore, in order to accurately determine a network status and avoid short-term disturbances, the weighted average $\overline{X}$ of the group of previous calculated bandwidth is taken as the threshold for determining the network status. When the calculated bandwidth is bigger than the weighted average ($x_i \geq \overline{X}$), the bandwidth trend is regarded as increasing, and when the calculated bandwidth is smaller than the weighted average ($x_i < \overline{X}$), the bandwidth trend is regarded as decreasing.

S3: According to different network statuses, the smoothness factor $\alpha$ is dynamically determined by considering the fluctuations of the network bandwidth. The ESM model is adopted to predict the trend of network bandwidth with the calculated bandwidth and the modified smoothness factor $\alpha$.

In the ESM model, the prediction value $T_t$ is a corrected value acquired by adding the previous prediction value $T_{t-1}$ to the amendment $x_t - T_{t-1}$ (produced in the previous prediction). The smoothness factor $\alpha$ determines a correction extent, when the value of $\alpha$ becomes larger, the correction extent becomes larger. The intensity of the network fluctuations needs to be considered during the determination of the smoothness factor. According to different network statuses, the smoothness factors should be determined to adapt to the basic characteristic of the TCP congestion control, namely "additive increase/multiplicative decrease". That is, when the network bandwidth decreases, a relative large smoothness factor is utilized to quickly adapt to the trend of network bandwidth. When the network bandwidth increases, a relative small smoothness factor is utilized to ensure a smooth bandwidth increase. Additionally, when the network bandwidth fluctuates seriously, a relative large smoothness factor is utilized to quickly adapt to the change of the network bandwidth. When the network bandwidth changes smoothly, a relative small smoothness factor is utilized to maintain the smoothness.

In this embodiment, the proposed optimal method for selecting the smoothness factor considers the above two aspects and to define the smoothness factor as a function of the calculated bandwidth x, and the weighted average $\overline{X}$. The smoothness factor is defined as in the following equation.

$$\alpha = \begin{cases} \min\left(1, \left(\beta_1 \frac{\max(x_i, \overline{X})}{\min(x_i, \overline{X})} + \lambda\right)\right) & x_i < \overline{X} \\ \min\left(1, \left(\beta_2 \frac{\max(x_i, \overline{X})}{\min(x_i, \overline{X})} + \lambda\right)\right) & x_i \geq \overline{X} \end{cases} \quad (3)$$

$$\lambda = \sqrt{\frac{1}{N}\sum_{j=1}^{N}((x_j - \overline{X})/(x_j + \overline{X}))^2}$$

where $\beta_1$ and $\beta_2$ are two constants within (0,1), and $\beta_1 > \beta_2$. It is noted that $\max(x_i, \overline{X})/\min(x_i, \overline{X}) \geq 1$, when $x_i \geq \overline{X}$, a small constant $\beta_2$ may decrease the smoothness factor $\alpha$. On the other side, when $x_i < \overline{X}$, that is, the network bandwidth decreases, the large constant $\beta_1$ may increase the smoothness factor $\alpha$. At the same time, the value of $\lambda$ is changed according to different fluctuation degrees of the bandwidth. That is, when the bandwidth fluctuates seriously, $\lambda$ equals to a relatively bigger value, and vice versa.

Figure 3:
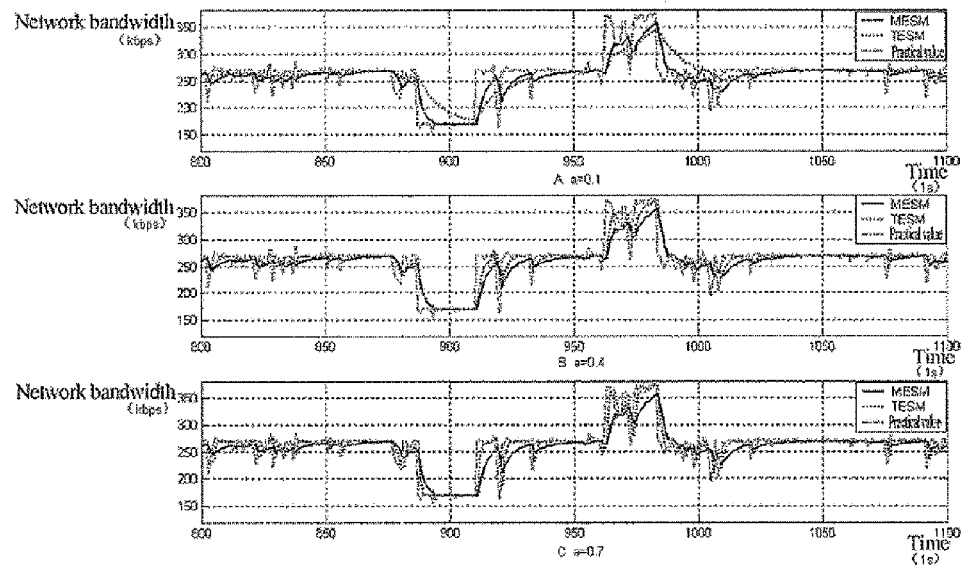
FIG. 3 is a comparison diagram between the modified ESM model and the traditional ESM model.

The modified ESM model adopts the smoothness factor $\alpha$ to predict the trend of network bandwidth. The comparison between the modified ESM model (MESM, in which N is 20, $\beta_1$ is 0.2, and $\beta_2$ is 0.1) and the traditional ESM model (TESM) is as shown in FIG. 3. The smoothness factor $\alpha$ in FIG. 3A is 0.1, the smoothness factor $\alpha$ in FIG. 3B is 0.4, and the smoothness factor $\alpha$ in FIG. 3C is 0.7. As shown in FIG. 3A, in the TESM model, when the smoothness factor is a small value, the increase of the bandwidth has a desirable smooth characteristic, but the decrease of the bandwidth is still smooth, so the characteristic of "additive increase/multiplicative decrease" is not met. In FIG. 3C, the smoothness factor has a large value, the decrease of the bandwidth meets the change trend of the bandwidth well, but the increase thereof still keeps this characteristic, so such adjustment is sensitive to the change of the bandwidth, causing that the adjustment is not smooth, and meanwhile, the characteristic of "additive increase/multiplicative decrease" is also not met. The smoothness factor in FIG. 3B has a medium value, the decrease speed is similar, to the MESM but the increase speed is still too high. Meanwhile, as the smoothness factor in FIG. 3B has a fixed value, for different situations of network fluctuations, the adjustment mode is the same, and the influences of the bandwidth disturbance are inevitable, and the smoothness of the output value cannot be ensured. In general, the modified ESM model, while achieving an accurate prediction, (a relative accumulated prediction error is 5.77%, and the number of prediction points that a relative prediction error is smaller than 10% occupies 81.70% of the total number of prediction points), has a desirable "additive increase/multiplicative decrease" characteristic, and meanwhile, can adaptively adjust the smoothness factor according to different degrees of the bandwidth fluctuations, so the overall control result has desirable smoothness. Therefore, the present invention may adopt the TESM model but preferably adopt the MESM model.

The bandwidth trend prediction obtained through the model-based long time-scale bandwidth trend extraction method is used as an initial value for bandwidth fluctuation detection in a short time-scale.

2 A Short Time-Scale Bandwidth Fluctuation Detection Method Based on Triple-Statuses A short measurement interval needs to be used for the bandwidth fluctuation detection. The additive increase/multiplicative decrease method (AIMD) is suitable for responding to network fluctuations within a short time and its basic idea is: additively increase the estimated bandwidth when there is no congestion, multiplicatively decrease the estimated bandwidth when there is a network congestion, and maintain the estimated bandwidth when the network status is full load. The AIMD method can be described by the following equation:

$$f(n+1) = \begin{cases} \omega \times f(n) & \text{Congestion} \\ f(n) + \theta & \text{Others} \end{cases} \quad (0 \leq \omega < 1, \theta \geq 0) \quad (4)$$

where the parameter $\omega$ is the multiplicative factor, the parameter $\theta$ is the additive factor, $f(n+1)$ and $f(n)$ are estimated bandwidths at time n+1 and n, respectively. The AIMD method can efficiently avoid frequently triggering the network congestion (caused by rapidly increase of the estimated bandwidth), which is one of the advantages of the AIMD method. However, the additive factor for increasing the estimated bandwidth is a constant and cannot dynamically adapt to different network bandwidth fluctuation. If the additive factor is set to be a relative small value, the bandwidth increases too slowly (such that the network bandwidth resources cannot be fully utilized). If the additive factor is set to be a relative large value, the change of the bandwidth becomes too frequent. In addition, the multiplicative factor is also set to be a constant in advance. When the estimated bandwidth is reduced, the practical congestion level of the network is not fully considered. In addition, the output bandwidth of the AIMD method cannot maintain smooth and may result in a sawtooth shape within a short time.

However, the video transmission can tolerate a relative small amount of packet loss. Our experimental results indicate that the quality of the reconstructed video at the decoder (video receiver) decreases with the increase of the packet loss ratio. When the packet loss ratio is within a certain range, the quality of the reconstructed video can be ensured. When the packet loss ratio exceeds this certain range, the quality of the reconstructed video will be degraded seriously. Therefore, in this application, the packet loss ratio is employed as a main index for the division of network channel status. It can be understood that other network feedback parameters (such as round-trip delay jitters) can also be employed. To prevent the video quality at the decoder (video receiver) from serious fluctuation caused by frequently adjusting the encoding target bit rate, the network status is divided into three categories, namely, the light load, the full load and the congestion load according to two predefined thresholds, $P_1$ and $P_2$. If the packet loss ratio $P_{loss}(n)$ is smaller than the lower threshold $P_1$, the estimated bandwidth f(n) is additively increased. If the $P_{loss}(n)$ is greater than the upper threshold $P_2$, the estimated bandwidth f(n) is multiplicatively decreased.

Figure 4:
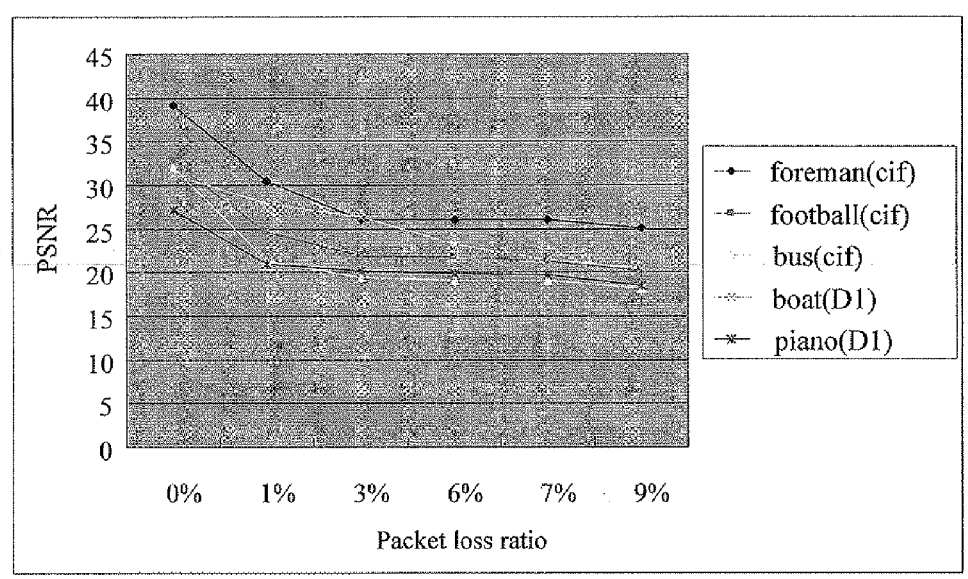
FIG. 4 is a curve diagram of recovery quality of video sequences in different packet loss ratios.

The selection of the two thresholds $P_1$ and $P_2$ needs to consider the influence thereof on the video quality, a relative small value should be assigned to the threshold to reduce the influences of the QoS oscillation. The threshold should be determined to ensure that the video quality at the decoder is within a controllable range. FIG. 4 shows Peak Signal to Noise Ratio (PSNR) values of the reconstructed videos of the five standard video standard sequences (namely, Foreman, Football, Bus, Boat and Piano) under different packet loss ratios. As shown in FIG. 4, when the packet loss ratio is between 0.03 and 0.07, the change of the PSNR value is not obvious. When the packet loss ratio exceeds 0.07, the PSNR value starts to obviously decrease. Therefore, the thresholds and can be set to 0.03 and 0.07, respectively.

The above conventional method is applicable to the present application. More preferably, on the basis of dividing the network status, the present application further propose a bandwidth decision method of dynamically adjusting the additive factor and the multiplicative factor, which is described as follows $$f(n+1) = \begin{cases} \max\{f(n) + \theta, F_{min}\} & P_{loss}(n) \leq P_1 \\ \min\{\omega \cdot f(n), F_{max}\} & P_{loss}(n) > P_2 \quad (0 \leq \omega < 1, \theta \geq 0) \\ f(n) & \text{else} \end{cases} \quad (5)$$

where the range of the estimated bandwidth f (n) is set to $[F_{min}, F_{max}]$, the predicted trend network bandwidth $T_t$ is used as the initial value, that is, $f(0)=T_t$.

For the transmission system based on the RTCP protocol, since there is some delay of the collection and transmission of RTCP feedback information, the adjustment according to the RTCP feedback may take a long time to achieve a stable value. Therefore, during bandwidth adjustment, not only the current packet loss ratio and congestion level of the network, but also the lag of the RTCP feedback information should be considered. Therefore, the method for deciding the multiplicative factor ω is to set the factor as a function of the packet loss ratio:

$$\omega = 1 - \beta \cdot \sqrt{P_{loss}(n)} \qquad (6)$$

where ω is the multiplicative factor, the coefficient β∈[0,1], with the increase of β, the influence of the packet loss ratio on the multiplicative factor ω also increases, and vice versa.

Figure 5:
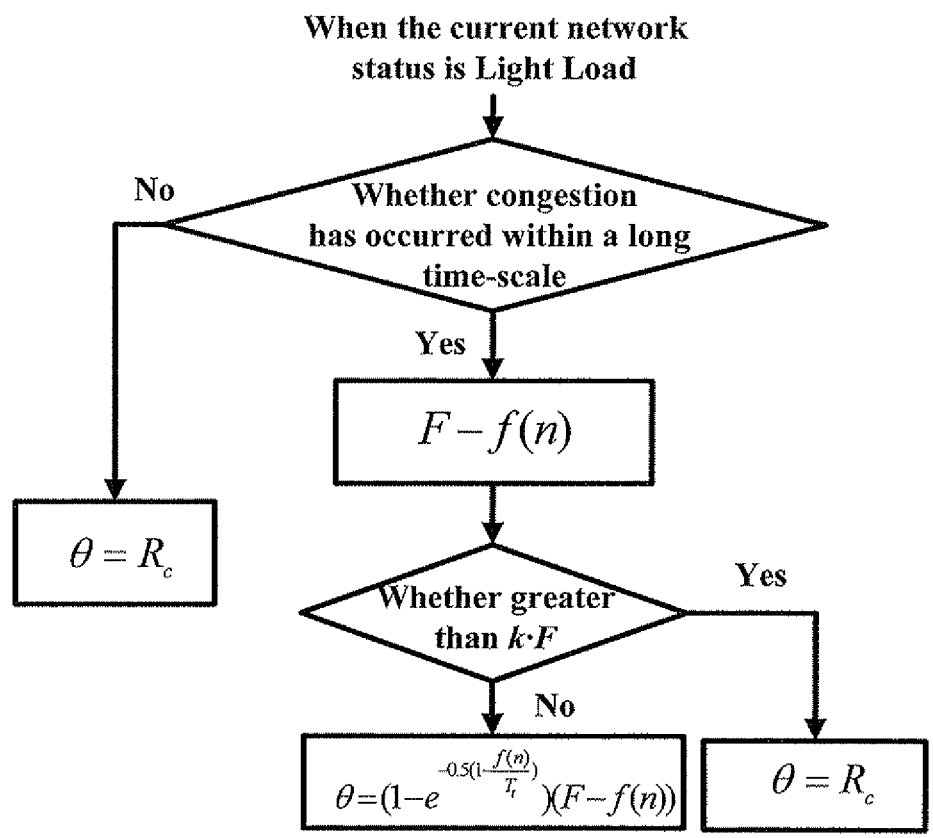
FIG. 5 is a flow chart of additive factor adjustment.

In the dynamic adjustment of the additive factor, the current estimated bandwidth is determined according to the previous estimated bandwidth f(n) and the estimated bandwidth when the last congestion occurs. When the congestion occurs, the estimated bandwidth is multiplicatively decreased and the estimated bandwidth at this time is recorded as F. If the difference between f(n) and F is relatively large, the additive factor equals to a constant $R_c$. If the difference between f(n) and F is relatively small but still not close enough to the estimated bandwidth when the last congestion occurs, the additive factor is determined according to the difference between f(n) and F. The smaller the difference is, the smaller the additive factor is. If the estimated bandwidth is close to the bandwidth of the previous congestion but the network status is the light load, it indicates that the previous network congestion occurs temporarily, and the additive factor equals to the constant $R_c$. The method for dynamically adjusting the additive factor is described as follows and the specific adjustment method is as shown in FIG. 5.

It is assumed that F is the estimated bandwidth when the last congestion occurs within a long time-scale. $T_t$ is the predicted trend of network bandwidth output by the long time-scale transmission control. $R_c$ is a constant, and k∈[0,1].

If no congestion has occurred within a long time-scale, setting the additive factor as a constant, namely, θ=$R_c$.

If congestion has occurred within a long time-scale and the current network status is light load, if F−f(n)<k·F, setting the additive factor as follows:

$$\theta = (1 - e^{-0.5(1 - f(n)/T_t)})(F - f(n)) \qquad (7)$$

and otherwise, if F−f(n)≥k·F, setting the additive factor as a constant, namely, θ=$R_c$.

Figure 6:
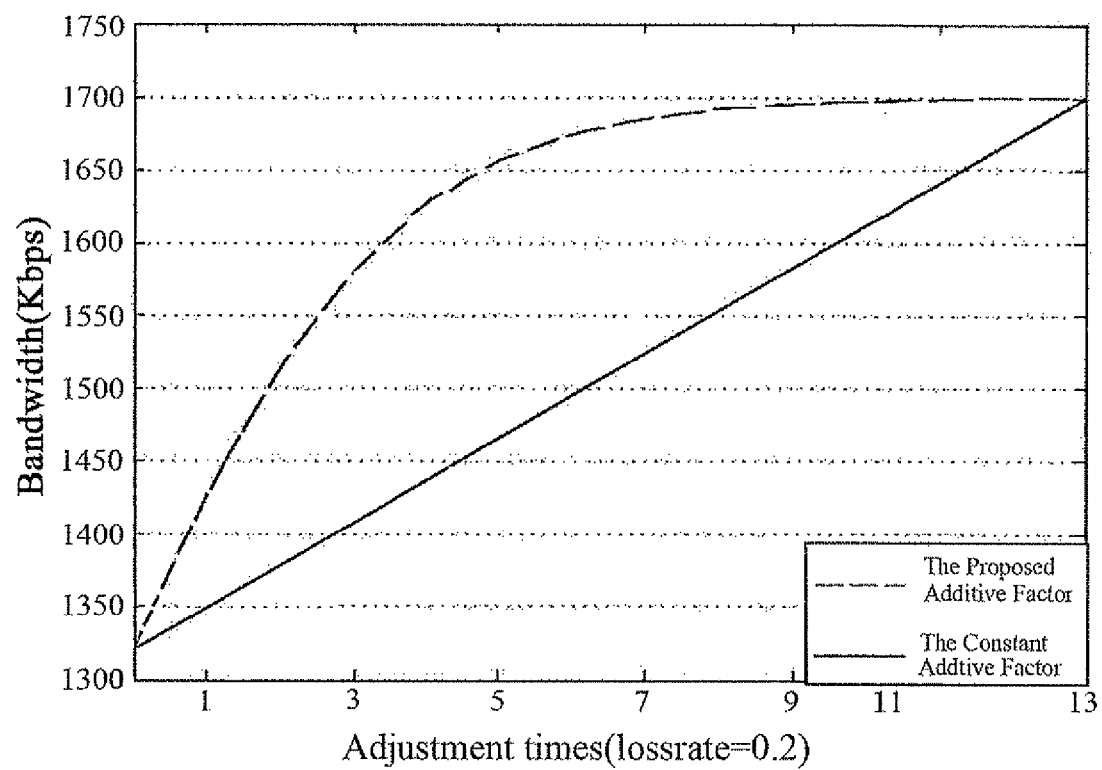
FIG. 6 is a schematic diagram of an effect of additive factor dynamic adjustment.

An example of dynamic adjustment of the additive factor is as shown in FIG. 6. It is assumed that the bandwidth when the last congestion occurs is 1700 Kbps, the packet loss ratio is 0.2, the predicted trend of network bandwidth is 800 Kbps, β in the multiplication factor determination is set to 0.5, and the fixed additive factor $R_c$ is set to 30 Kbps. As shown in FIG. 6, compared with the method with the fixed additive factor, the proposed method for dynamically adjusting the additive factor can utilize the bandwidth more efficiently and can ensure the smoothness.

Figure 7:
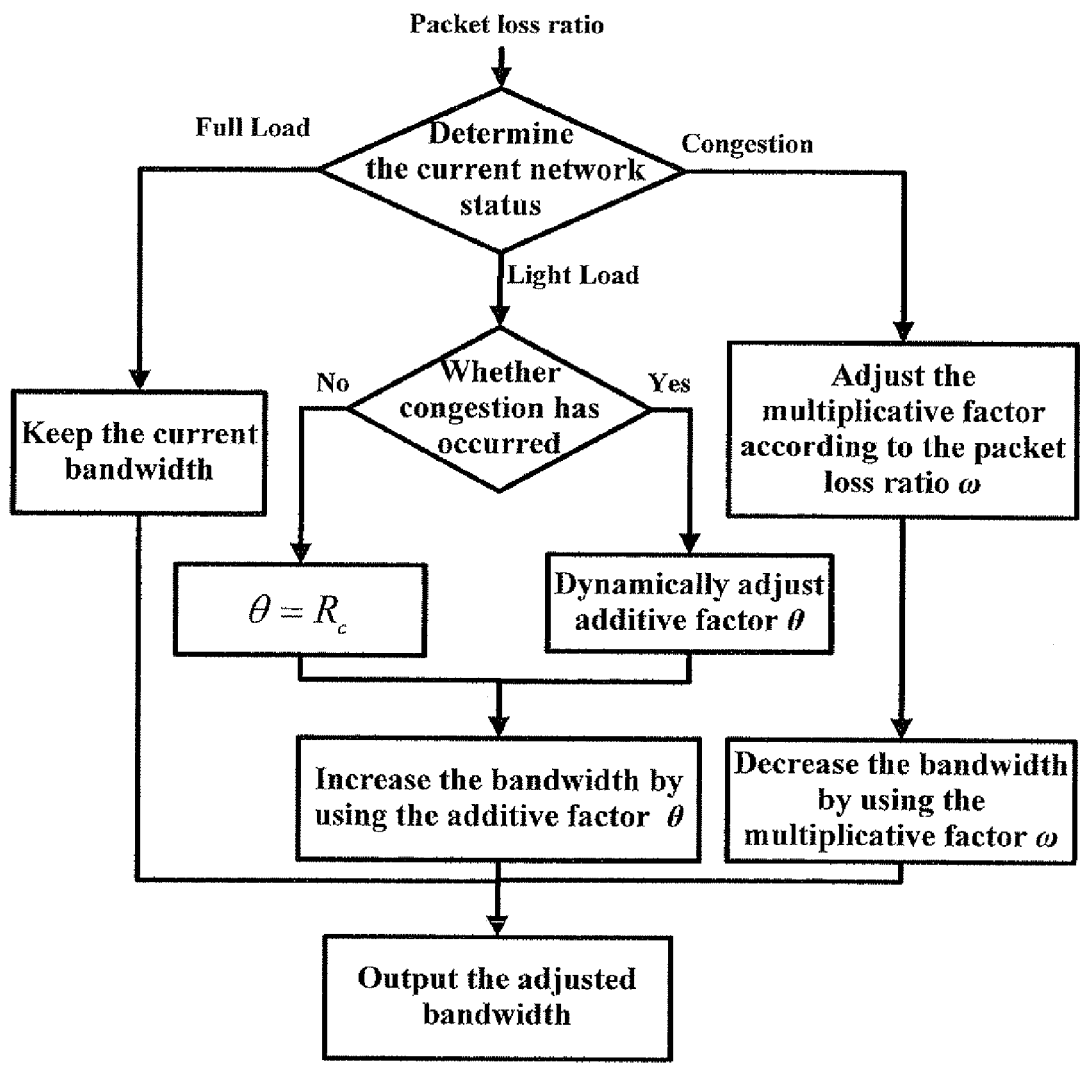
FIG. 7 is a flow chart of a method for detecting bandwidth fluctuations based on short time-scale of three statuses.

In this embodiment, FIG. 7 shows a process of an optimal short time-scale bandwidth fluctuation detection method based on triple-statuses.

3 A Target Bit Rate Smooth Adjustment Method Based on Two Asymmetrical Thresholds During the period of target bit rate adjustment, the encoder adjusts its target bit rate according to the current estimated bandwidth. The timelier that the encoding target bit rate is adjusted, the higher the utilization rate of the network bandwidth by the system is. However, the small change of bandwidth cannot cause apparent influences on the quality of reconstructed video in the decoder. Moreover, the frequent adjustment of the encoding target bit rate will cause frequent network fluctuations.

In order to fully utilize the network bandwidth and to avoid network fluctuations, the change of the PSNR of the reconstructed video is utilized as the criterion for adjusting the target bit rate of the encoder. The MPEG/VCEG experts increase the PSNR of the image by using 0.5 dB as a unit. This is because the difference of 0.5 dB can be visually perceived.

Therefore, in order to avoid apparent changes of the video quality during the adjustment of the target bit rate and in order to avoid the frequent adjustment of the target bit rate of the encoder, an up-threshold $th_{up}$ and a down-threshold $th_{down}$ are respectively set in the process of turning up and turning down the target bit rate. If the difference between the current estimated bandwidth and the previous estimated bandwidth is less than the up-threshold or less than the down-threshold (i.e., Δth<$th_{up}$ or Δth<$th_{down}$), the target bit rate of the encoder is not adjusted (Δth is acquired from the computation with Equation 8). If the difference between the current estimated bandwidth and the previous estimated bandwidth is not less than the up-threshold or not less than the down-threshold (i.e., Δth≥$th_{up}$ or Δth≥$th_{down}$), the target bit rate of the encoder is adjusted to be the current estimated bandwidth. The above method ensures that the network bandwidth can be fully utilized and no apparent changes occur to the video quality during the adjustment of the target bit rate.

$$\Delta th = |f(n) - f'| \qquad (8)$$

where f(n) is the estimated bandwidth at time n, and f' is the estimated bandwidth in the previous adjustment of the encoder.

According to different estimated bandwidth ranges, the selection of the adjustment thresholds $th_{up}$ and $th_{down}$ is different. Also, in order to satisfy the basic characteristic of "additive increase/multiplicative decrease", these two thresholds are selected to be asymmetrical. When a congestion occurs on the network, the target bit rate of the encoder needs to be turned down in time, and the sent data volume is decreased, so as to rapidly recover from the congestion. Therefore, the $th_{down}$ is selected to be smaller than $th_{up}$ for asymmetrical adjustment, so that when the bandwidth is turned down by a small extent, the target bit rate of the encoder can also be turned down in time. For example, for the video with the resolution of 352×288, through statistical analysis and the experiments of the standard test sequences and real-time captured videos, in this embodiment, the values of $th_{up}$ and $th_{down}$ are listed in Table 1.

| Network Bandwidth Range | $th_{up}$ (kbps) | $th_{down}$ (kbps) |
|---|---|---|
| >600 kbps | 150 | 75 |
| 128 kbps-600 kbps | 30 | 15 |
| <128 kbps | 10 | 5 |

Figure 8:
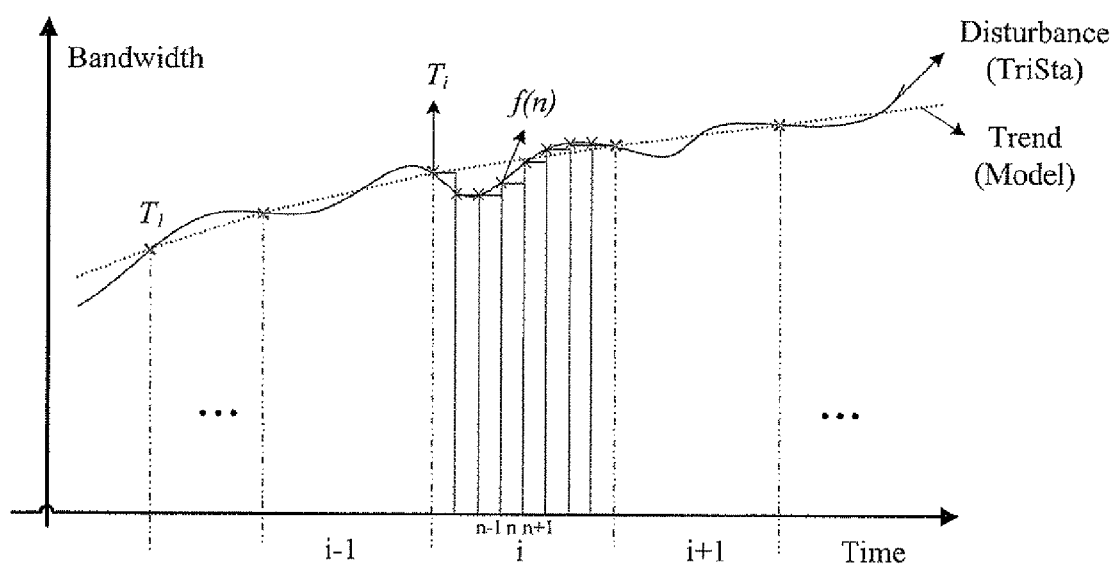
FIG. 8 is a schematic diagram of an effect of bandwidth detection and adjustment.

Table 1 Thresholds $th_{up}$ and $th_{down}$ for Different Ranges of Network Bandwidth The complete process of the method for two time-scales video stream transmission control is as shown in FIG. 8. Firstly, the trend of network bandwidth is predicted by using the proposed model-based long time-scale bandwidth trend extraction method to ensure the requirement of TCP-Friendliness of the video transmission in a long time-scale. Secondly, based on the predicted trend of network bandwidth, the bandwidth fluctuation is detected within a short time. In the proposed short time-scale bandwidth fluctuation detection method, the predicted trend of network bandwidth is used as the initial value, and according to the initial value and the feedback information of the network, the bandwidth fluctuations are dynamically detected, so as to ensure the real-time requirement of the video transmission in a short time-scale. Thirdly, a target bit rate adjustment method based on two asymmetrical thresholds is proposed to set an up-threshold and a down-threshold of bandwidth to avoid frequently adjusting the target bit rate of the encoder and to ensure a smooth perceptual quality.

Finally, it should be noted that the above embodiments are merely provided for describing the technical solutions of the present invention, but not intended to limit the present invention. It should be understood by persons of ordinary skill in the art that although the present invention has been described in detail with reference to the embodiments, modifications can be made to the technical solutions described in the embodiments, or equivalent replacements can be made to some technical features in the technical solutions, as long as such modifications or replacements do not depart from the spirit and scope of the present invention.

What is claimed is:

1. A method for two time-scales video stream transmission control, wherein transmission control is divided into a long time-scale and a short time-scale, one long time-scale including several short time-scales, the method comprising the steps of:
   (A) in the long time-scale transmission control, calculating a current bandwidth through a Transmission Control Protocol (TCP) throughput model, and predicting a trend of network bandwidth by using an Exponential Smooth Model (ESM) according to the calculated current bandwidth;
   (B) in the short time-scale transmission control, using the trend of network bandwidth predicted through Step (A) as an initial value, according to a network transmission packet loss ratio, dividing a network status into three categories, namely light load, full load, and congestion, when the network status is the light load, increasing an estimated bandwidth through an additive factor; when the network status is the congestion, decreasing the estimated bandwidth through a multiplicative factor; and when the network status is the full load, keeping the estimated bandwidth unchanged; and, the multiplicative factor is decided by adopting the following equation:

$$\omega = 1 - \beta \cdot \sqrt{P_{loss}(n)}$$

where $\omega$ is the multiplicative factor, $P_{loss}(n)$ is a packet loss ratio at time n, $\beta$ is a coefficient, and $\beta \in [0,1]$.

2. A method for two time-scales video stream transmission control, wherein transmission control is divided into a long time-scale and a short time-scale, one long time-scale including several short time-scales, the method comprising the steps of:
   (A) in the long time-scale transmission control, calculating a current bandwidth through a Transmission Control Protocol (TCP) throughput model, and predicting a trend of network bandwidth by using an Exponential Smooth Model (ESM) according to the calculated current bandwidth;
   (B) in the short time-scale transmission control, using the trend of network bandwidth predicted through Step (A) as an initial value, according to a network transmission packet loss ratio, dividing a network status into three categories, namely light load, full load, and congestion, when the network status is the light load, increasing an estimated bandwidth through an additive factor; when the network status is the congestion, decreasing the estimated bandwidth through a multiplicative factor; and when the network status is the full load, keeping the estimated bandwidth unchanged; and,
   the decision of the additive factor specifically comprises:
   if no congestion has occurred within a long time-scale, setting the additive factor as a constant;
   if congestion has occurred within a long time-scale, the following equation is adopted to decide the additive factor:

$$\theta = (1 - e^{-0.5(1 - f(n)/T_t)})(F - f(n))$$

where $\theta$ is the additive factor, F is an estimated bandwidth when the last congestion occurs, $T_t$ is a predicted trend of network bandwidth output by the long time-scale transmission control, and $f(n)$ is an estimated bandwidth at time n.

3. The method for two time-scales video stream transmission control according to claim 1 or 2, wherein in Step (A) the trend of network bandwidth is predicted by adopting the ESM in the following equation:

$$T_t = \alpha \times x_t + (1 - \alpha) \times T_{t-1}$$

where $T_t$ is a trend of network bandwidth at time t, $x_t$ is a current bandwidth at time t calculated through the TCP throughput model, and $\alpha$ is a smoothness factor, its range is (0,1).

4. The method for two time-scales video stream transmission control according to claim 3, wherein the smoothness factor is dynamically adjusted according to the current bandwidth status, when a network bandwidth increases, equals to a relatively small value within the range of, and when the network bandwidth decreases, equals to a relatively big value within the range of.

5. The method for two time-scales video stream transmission control according to claim 1 or 2, wherein further comprises Step (C):
   during adjustment of a target bit rate of an encoder, setting an up-threshold and a down-threshold for the estimated bandwidth, wherein if a difference between the estimated bandwidth and a current target bit rate of the encoder is between the two thresholds, the target bit rate of the encoder is not adjusted; and otherwise, the encoder adjusts its target bit rate according to the estimated bandwidth.

6. The method for two time-scale video stream transmission control according to claim 5, wherein in Step (C) values of the up-threshold and the down-threshold change according to different network bandwidth ranges, their values are asymmetrical, and the up-threshold is greater than the down-threshold.

* * * * *